(12) United States Patent
Kawazoe et al.

(10) Patent No.: US 8,913,070 B2
(45) Date of Patent: Dec. 16, 2014

(54) SERVER, SCREEN TRANSFER SYSTEM, AND SCREEN TRANSFER METHOD

(71) Applicant: Kabushiki Kaisha Toshiba, Minato-ku, Tokyo (JP)

(72) Inventors: Hiroshi Kawazoe, Kanagawa-ken (JP); Masataka Goto, Kanagawa-ken (JP); Takuya Kawamura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 150 days.

(21) Appl. No.: 13/744,521

(22) Filed: Jan. 18, 2013

(65) Prior Publication Data

US 2013/0249921 A1  Sep. 26, 2013

(30) Foreign Application Priority Data

Mar. 21, 2012 (JP) .................................. 2012-64300

(51) Int. Cl.
| | |
|---|---|
| G06T 1/60 | (2006.01) |
| G06F 15/00 | (2006.01) |
| G06T 1/00 | (2006.01) |
| G06F 3/14 | (2006.01) |
| G09G 5/14 | (2006.01) |

(52) U.S. Cl.
CPC ... *G06T 1/60* (2013.01); *G06F 3/14* (2013.01); *G09G 5/14* (2013.01); *G09G 2352/00* (2013.01); *G09G 2310/04* (2013.01); *G09G 2350/00* (2013.01)
USPC .......................................... 345/530; 345/501

(58) Field of Classification Search
CPC .................. G06F 15/00; G06F 15/16–15/161; G06T 1/00–1/0092; G06T 1/60
USPC .................... 345/501, 530; 709/201
See application file for complete search history.

(56) References Cited

U.S. PATENT DOCUMENTS

| | | | | |
|---|---|---|---|---|
| 8,310,493 | B1 * | 11/2012 | Lauder | 345/530 |
| 2003/0202575 | A1 * | 10/2003 | Williams et al. | 375/240.01 |
| 2008/0095151 | A1 | 4/2008 | Kawazoe et al. | |

FOREIGN PATENT DOCUMENTS

JP   2008-109269   5/2008

OTHER PUBLICATIONS

Richardson, The RFB Protocol, RealVNC Ltd., http://www.realvnc.com/docs.rfbproto.pdf.
Office Action of Notification of Reason for Rejection for Japanese Patent Application No. 2012-064300 Dated May 27, 2014, 4 pgs.

* cited by examiner

*Primary Examiner* — Jacinta M Crawford
(74) *Attorney, Agent, or Firm* — Amin, Turocy & Watson, LLP

(57) ABSTRACT

There is provided a server in which a screen update generating unit generates screen update information representing an image of an update area in a screen; a distributing unit distributes the screen update information to a transmitting unit selected from first to N-th transmitting units; a storage stores a generation history of the screen update information; and a precedence possibility determining unit specifies, based on the generation history of the screen update information, screen update information X and Y such that the screen update information X is more previously generated than the screen update information Y and that the image of the screen update information Y is permitted to be displayed prior to the screen update information X, wherein the distributing unit distributes the screen update information Y to the transmitting unit different from that of distributing the screen update information X.

16 Claims, 14 Drawing Sheets

EXAMPLE OF INFORMATION STORED IN HISTORY STORAGE 106

| SEQUENCE NUMBER | AREA INFORMATION | APP TYPE |
|---|---|---|
| 1 | (0, 0) — (320, 240) | DOCUMENT EDITION |
| 2 | (320, 240) — (640, 480) | TABLE CALCULATION |
| 3 | (80, 60) — (240, 180) | DOCUMENT EDITION |
| 4 | (160, 120) — (320, 2400) | DOCUMENT EDITION |
| | | |
| | | |

F I G. 4

| SEQUENCE NUMBER | PRECEDENCE POSSIBILITY INFORMATION | |
|---|---|---|
| | NUMBER | SEQUENCE NUMBER |
| 3 | 0 | — |
| 4 | 0 | — |
| 6 | 3 | 2, 3, 4 |

COUNTER VALUE = 2

SCREEN UPDATE PERFORMED IN ADVANCE = NOT EXIST

FIG. 10

| SEQUENCE NUMBER | PRECEDENCE POSSIBILITY INFORMATION | |
|---|---|---|
| | NUMBER | SEQUENCE NUMBER |
| 3 | 0 | — |
| 4 | 0 | — |
| 5 | 3 | 2, 3, 4 |
| 6 | 3 | 2, 3, 4 |

COUNTER VALUE = 2

SCREEN UPDATE PERFORMED IN ADVANCE = NOT EXIST

FIG. 11

| SEQUENCE NUMBER | PRECEDENCE POSSIBILITY INFORMATION | |
|---|---|---|
| | NUMBER | SEQUENCE NUMBER |
| 3 | 0 | — |
| 4 | 0 | — |
| 6 | 3 | 2, 3, 4 |

COUNTER VALUE = 2

SCREEN UPDATE PERFORMED IN ADVANCE = 5

FIG. 12

| SEQUENCE NUMBER | PRECEDENCE POSSIBILITY INFORMATION | |
|---|---|---|
| | NUMBER | SEQUENCE NUMBER |
| 3 | 0 | — |
| 4 | 0 | — |

COUNTER VALUE = 2
SCREEN UPDATE PERFORMED IN ADVANCE = 5, 6

FIG. 13

| SEQUENCE NUMBER | PRECEDENCE POSSIBILITY INFORMATION | |
|---|---|---|
| | NUMBER | SEQUENCE NUMBER |
| 2 | 0 | — |
| 3 | 0 | — |
| 4 | 0 | — |

COUNTER VALUE = 2
SCREEN UPDATE PERFORMED IN ADVANCE = 5, 6

FIG. 14

SERVER, SCREEN TRANSFER SYSTEM, AND SCREEN TRANSFER METHOD

CROSS REFERENCE TO RELATED APPLICATIONS

This application is based upon and claims the benefit of priority from the prior Japanese Patent Application No. 2012-64300, filed on Mar. 21, 2012, the entire contents of which are incorporated herein by reference.

FIELD

Embodiments described herein relates to a server, a screen transfer system, and a screen transfer method.

BACKGROUND

There is a "screen transfer system" in which information on a screen of a server is packetized and distributed in real time from the server to a client terminal connected to the server via a network.

The client terminal receives and displays the screen information on a part or all of a screen area held in the server. Further, information on a user's operation performed at the client terminal is transmitted to the server. This system enables information on a screen of a remote server to be displayed and referred to at a terminal at hand, and hence is expected to be used for various applications, such as, for example, a remote monitoring system.

As methods for configuring a screen transfer system, there are a method in which contents of a whole screen area held in a server are packetized every fixed time period, so as to be distributed to each of client terminals, and a method in which, each time a change is caused in the drawing state in a screen area, only the information representing the difference due to the change is distributed together with the information on the area where the change is caused. In the latter method of distributing the difference, data of only a required portion are generated according to the change in the drawing state. Therefore, as compared with the former method, the latter method has advantages that a network band can be efficiently used, and that the number of drawing frames per unit time can be increased. Therefore, services based on the latter method are generally provided in many cases.

The difference for obtaining a latest drawing state in a screen area is referred to as screen update information. A latest drawing state can be obtained by reflecting the screen update information in the frame buffer in which the last drawing state is stored.

Further, in a screen transfer system, a TCP (Transmission Control Protocol) is generally used as a transmission protocol. The TCP realizes connection type communication between a server and a client terminal, and guarantees the reliability and sequentiality of data transfer by retransmission. In the screen transfer system, only a difference in a drawing state is generally distributed. If the reliability and the sequentiality are not guaranteed in the data transfer, loss and sequence replacement are caused in the data transfer, so that the drawing state of the server and the drawing state of the client terminal are not coincident with each other and thereby the use feeling is worsened. Therefore, the TCP, which guarantees the reliability and the sequentiality in the data transfer, has an advantage in this respect. Further, as compared with the other transmission protocols, such as a UDP (User Datagram Protocol), the TCP has an advantage of easily complying with the security policy of an introduced network. From these reasons, the TCP is used in many screen transfer systems.

In the screen transfer system, it is an important issue to provide a sufficient responsiveness. The responsiveness means the quality of the screen transfer during a time period (response time) from the time when an operation, such as a click operation, is performed at a client terminal to the time when the screen change, which is generated at the server in correspondence with the operation, is reflected at the client terminal. When the responsiveness is not sufficient (response time is large), the user has to wait for the period of response before confirming the result of the operation. This results in adverse effects that the working efficiency is deteriorated and that an operation is erroneously performed.

However, in a screen transfer system using a TCP, when a packet is lost during transfer of packets, the responsiveness may be deteriorated. This is due to the fact that the sequentiality is guaranteed in data transfer based on TCP. When a packet corresponding to update of a screen is lost, the client terminal cannot perform drawing processing based on the received screen update information until retransmission of the lost packet is completed. Therefore, during this period, the drawing is temporarily stopped in the client terminal until the retransmission is completed. As a result, it appears that a delay is caused in the display.

BRIEF DESCRIPTION OF THE DRAWINGS

FIG. 4 is a view showing an example of information stored in a history storage;

FIG. 10 is a view showing an example of an operation in the client terminal;

FIG. 11 is a view following FIG. 10;

FIG. 12 is a view following FIG. 11;

FIG. 13 is a view following FIG. 12; and

FIG. 14 is a view following FIG. 13.

DETAILED DESCRIPTION

According to some embodiments, there is provided a server including: a screen update generating unit, first to N-th (N is an integer of 2 or more) transmitting units, a distributing unit, a screen update history storage and a precedence possibility determining unit.

The screen update generating unit generates screen update information representing an image of an update area in a screen.

The first to N-th (N is an integer of 2 or more) transmitting units communicates with a client terminal.

The distributing unit distributes the screen update information to the transmitting unit selected from the first to the N-th transmitting units.

The screen update history storage stores a generation history of the screen update information.

The precedence possibility determining unit specifies, based on the generation history of the screen update information, screen update information X and Y such that the screen update information X is more previously generated than the screen update information Y and that the image of the screen update information Y is permitted to be displayed prior to the screen update information X.

The distributing unit distributes the screen update information Y to the transmitting unit different from the transmitting unit to which the screen update information X is distributed.

The first to the N-th transmitting units the transmit screen update information distributed by the distributing unit to the client terminal.

In the following, embodiments will be described with reference to the accompanying drawings.

Figure 1:
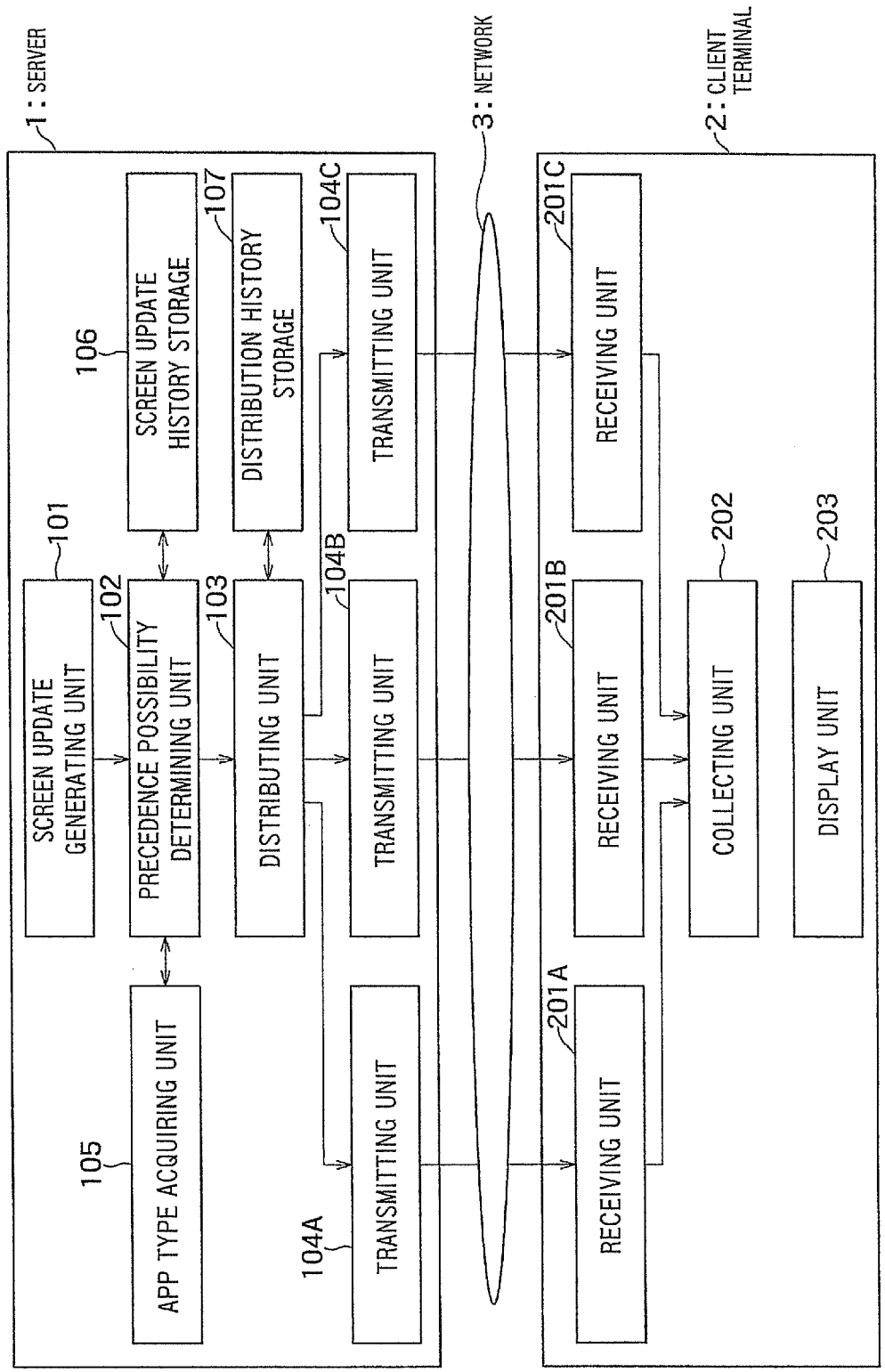
FIG. 1 is a view showing a configuration of a screen transfer system including a server as an embodiment.

FIG. 1 is a view showing a configuration of a screen transfer system including a server as an embodiment. In this configuration, an information processing terminal (server) 1 functioning as a server, and an information processing terminal (client terminal) 2 functioning as a client are connected via a network 3.

[Configuration of Server]

The server 1 includes, as its components, a screen update generating unit 101, a precedence possibility determining unit 102, a distributing unit 103, transmitting units 104A, 104B and 104C, an APP type acquiring unit 105, a screen update history storage 106, and a distribution history storage 107.

The screen update generating unit 101 generates screen update information according to an execution state of the operating system and application in the server 1. The screen update information is information for changing a drawing state of a screen.

Figure 2:
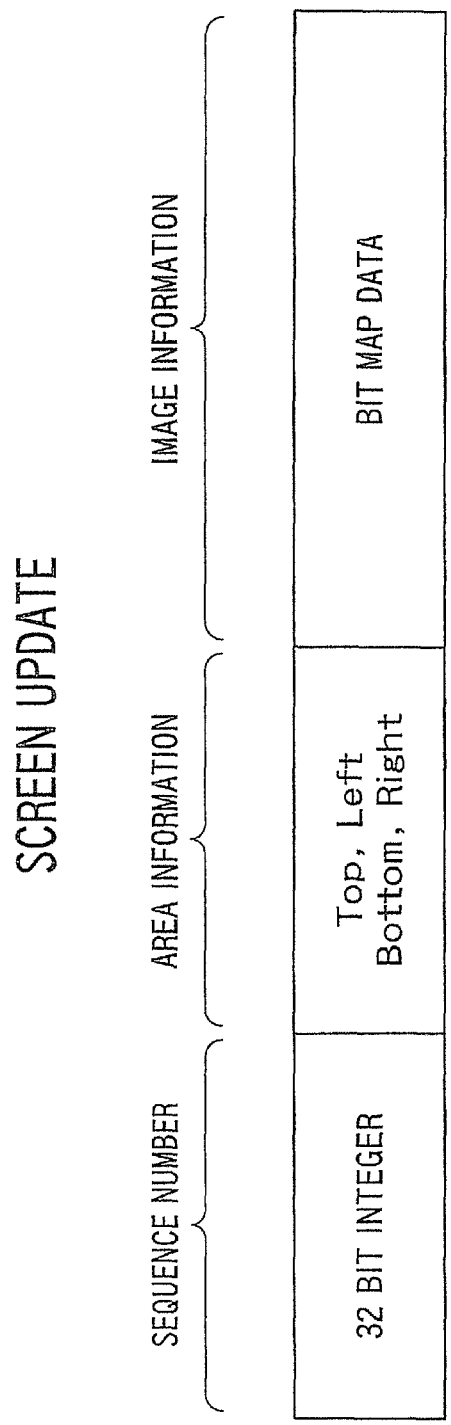
FIG. 2 is a view showing an example of screen update information.

FIG. 2 shows an example of screen update information. The screen update information includes a sequence number representing a temporal order of updates of a screen, area information representing a position of an area to be updated, and image information of the corresponding area. The sequence number is a 32 bit integer starting from 0. The area information is represented by numerical values which represent display positions of image information in a screen area.

Figure 3:
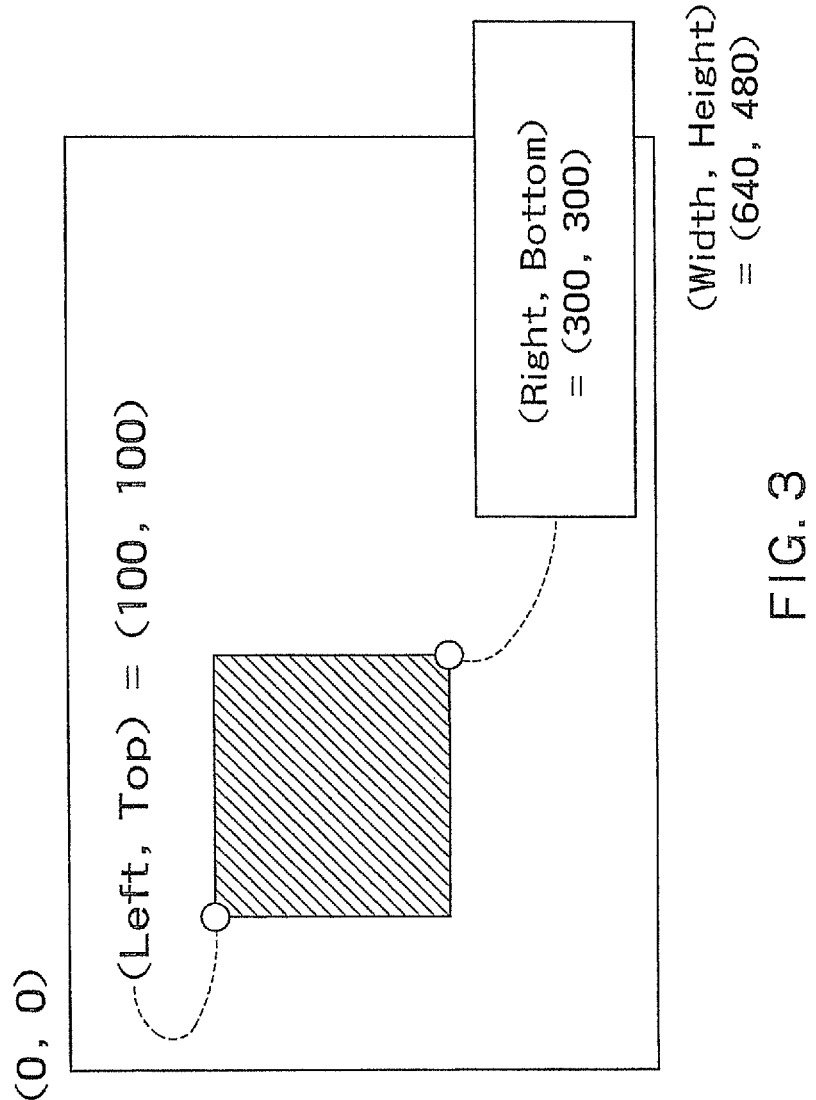
FIG. 3 is a view showing an example of rectangle information.

For example, as shown in FIG. 3, when the upper left corner of the screen area is set as (0, 0), and when the lower right corner is also set as (Width, Height), the area information is represented by rectangle information including upper left coordinates (Left, Top) and lower right coordinates (Right, Bottom) of the display positions. The image information includes updated bit map data (values of RGB three colors in each pixel in the rectangle, and the like) in the area corresponding to the area information.

The precedence possibility determining unit 102 determines whether or not the screen update based on certain screen update information can be performed prior to other screen update information. Originally, it is necessary that the screen update information generated in the screen update generating unit 101 of the server 1 is subjected to display processing in the client terminal 2 in the order of the sequence at which the screen update information is generated (in the order of the sequence number). This is because, when the order is changed in the client terminal, the drawing state in the server, and the drawing state in the client terminal are not coincident with each other and thereby the use feeling is worsened. Therefore, in principle, the screen update based on arbitrary screen update information is not allowed to be performed prior to the screen update based on the screen update information which is temporally older (has a smaller sequence number) than the arbitrary screen update information.

However, in a certain situation, there is considered a case where, even when the orders of display processing of two kinds of screen update information are changed, the degree of worsening of the use feeling of the user is comparatively low. The examples of the case include a case where certain screen update information is generated in a window of an application different from an application of screen update information temporally older than the certain screen update information (the other specific example will be described below). In such a case, even when the screen update based on the certain screen update information is performed prior to the screen update based on the screen update information temporally older than the certain screen update information, almost no sense of incongruity is caused at user's eyes.

Therefore, from old screen update information generated prior to the certain screen update information, the precedence possibility determining unit 102 specifies, by using the screen update history storage 106, screen update information which allows the certain screen update information to be displayed prior to itself (precedence possibility determining processing). Then, information (precedence possibility information), which is used to identify the old screen update information that may be displayed after the certain screen update information, is added to the certain screen update information. Note that, in some cases, the old screen update information, which allows the certain screen update information to be displayed prior to itself, is referred to as screen update information X, and the screen update based on the screen update information X is referred to as screen update X. Further, in some cases, the certain screen update information, which can be displayed prior to the old screen update information, is referred to as screen update information Y, and the screen update based on the screen update information Y is referred to as screen update Y.

The distributing unit 103 distributes the screen update information generated by the screen update generating unit 101 to a transmitting unit selected from the plurality of transmitting units 104A, 104B and 104C. When transmitting the screen update information (screen update information Y) which can be displayed in advance, the distributing unit 103 distributes the screen update information Y to a transmitting unit 104 different from the transmitting unit 104 to which the screen update information X allowing the screen update information Y to be displayed in advance is distributed.

The transmitting unit 104 performs transmission processing of the screen update information distributed from the distributing unit 103. The transmitting unit 104 converts the screen update information inputted from the distributing unit 103 into a form which can be transmitted on the network, and transmits the converted information to the client terminal 2. As a transmission protocol, TCP/IP is used.

The APP type acquiring unit 105 acquires a type of application (hereinafter, referred to as APP type) of a window in which the screen update is performed (that is, a window whose screen update information is generated).

The screen update history storage 106 stores the screen update history, that is, the generation history of screen update information. Each time screen update is generated and also the above-described precedence possibility determining processing is performed by the precedence possibility determining unit 102, the information about the newly generated screen update is stored in the screen update history storage 106.

FIG. 4 shows an example of histories stored in the screen update history storage 106. In this example, the sequence number, the area information, and the APP type information are stored as information relating to a screen update.

[Configuration of Client Terminal]

The client terminal 2 includes, as its components, receiving units 201A, 201B and 201C, a collecting unit 202, and a display unit 203.

The receiving units 201A, 201B and 201C receive screen update information from the server 1 via the network 3.

The collecting unit 202 collects screen update information from the plurality of receiving units 201A, 201B and 201C.

The display unit 203 has a storage area (frame buffer) for storing the screen information of the whole screen area. When receiving the screen update information, the display unit 203 updates the information in the storage area indicated by the area information, by overwriting the image information of the screen update information on the information in the storage area. The display unit 203 presents the screen information to the user by presenting the data of the storage area on the screen.

[Processing Flow]

Next, the processing performed by the screen transfer system according to the present embodiment will be described with appropriate reference to the accompanying drawings. The server 1 and the client terminal 2 are physically connected to each other via the network 3. In the present embodiment, the network is assumed to be an IP (Internet Protocol) network.

[Processing Flow (Generation of Screen Update)]

When execution of transfer of a screen is started, the screen update generating unit 101 updates the screen according to execution states of the operating system and application of the server 1, so as to generate screen update information. The screen update information is configured as shown in FIG. 2. The screen update generating unit 101 has a counter for storing a value (zero start) of the present sequence number. Each time the screen update generating unit 101 generates screen update information, the screen update generating unit 101 adds the value of the counter to the generated screen update information and then increments the value of the counter by one. The screen update generating unit 101 outputs the screen update information to the precedence possibility determining unit 102.

[Processing Flow (Determination Whether to Allow Precedence)]

When receiving the screen update information, the precedence possibility determining unit 102 determines whether or not the received screen update information can precede the previous screen update information. Here, that certain screen update information Y can precede the other screen update information X means that, even when the screen update based on the screen update information Y is performed prior to the screen update based on the screen update information X in the client terminal 2, almost no sense of incongruity is caused at user's eyes. By using the history of screen update stored in the screen update history storage 106, and by using the APP type information acquired from the APP type acquiring unit 105, the precedence possibility determining unit 102 determines whether or not the received screen update information can precede the previous screen update information.

First, the precedence possibility determining unit 102 transfers the area information of the received screen update to the APP type acquiring unit 105, so as to require the APP type acquiring unit 105 to acquire the APP type of the area information. The APP type acquiring unit 105 acquires the APP type of the transferred area information by an arbitrary method, and returns the acquired APP type to the precedence possibility determining unit 102.

Next, the precedence possibility determining unit 102 reads the latest information from the histories stored in the screen update history storage 106. Then, the precedence possibility determining unit 102 determines whether or not the screen update information received from the screen update generating unit 101 can precede the information read from the screen update history storage 106. The specific procedure for the determination will be described below.

When determining that the screen update information received from the screen update generating unit 101 can precede the information read from the screen update history storage 106, the precedence possibility determining unit 102 reads the second latest information from the histories stored in the screen update history storage 106. Then, the precedence possibility determining unit 102 similarly determines whether or not the screen update information received from the screen update generating unit 101 can precede the information read from the screen update history storage 106. The precedence possibility determining unit 102 repeatedly performs such determination processing in order from the latest history until determining that the screen update information received from the screen update generating unit 101 cannot precede the information read from the screen update history storage 106. When determining that the screen update information received from the screen update generating unit 101 cannot precede the information, read from the screen update history storage 106, the precedence possibility determining unit 102 adds the number of screen updates allowing to be preceded and the list of the sequence numbers of the screen updates, to the screen update information received from the screen update generating unit 101.

An example of the above-described processing is described. Now, it is assumed that four screen update histories having sequence numbers 1 to 4 are stored in the screen update history storage 106, and that the precedence possibility determining unit 102 receives screen update information having the sequence number 5 from the screen update generating unit 101.

After acquiring the APP type corresponding to the screen update information having the sequence number 5 from the APP type acquiring unit 105, the precedence possibility determining unit 102 first reads the history information having the sequence number 4 from the screen update history storage 106, and determines whether or not the screen update corresponding to the sequence number 5 can be performed prior to the screen update corresponding to the sequence number 4. It is assumed that the screen update corresponding to the sequence number 5 can be performed prior to the screen update corresponding to the sequence number 4.

Next, the precedence possibility determining unit 102 reads the history information having the sequence number 3 from the screen update history storage 106, and similarly determines whether or not the screen update corresponding to the sequence number 5 can be performed prior to the screen update corresponding to the sequence number 3. It is assumed that the screen update corresponding to the sequence number 5 can be performed prior to the screen update corresponding to the sequence number 3.

Next, the precedence possibility determining unit 102 reads the history information having the sequence number 2 from the screen update history storage 106, and determines whether or not the screen update corresponding to the sequence number 5 can be performed prior to the screen update corresponding to the sequence number 2. It is assumed that the screen update corresponding to the sequence number 5 cannot be performed prior to the screen update corresponding to the sequence number 2.

Figure 5:
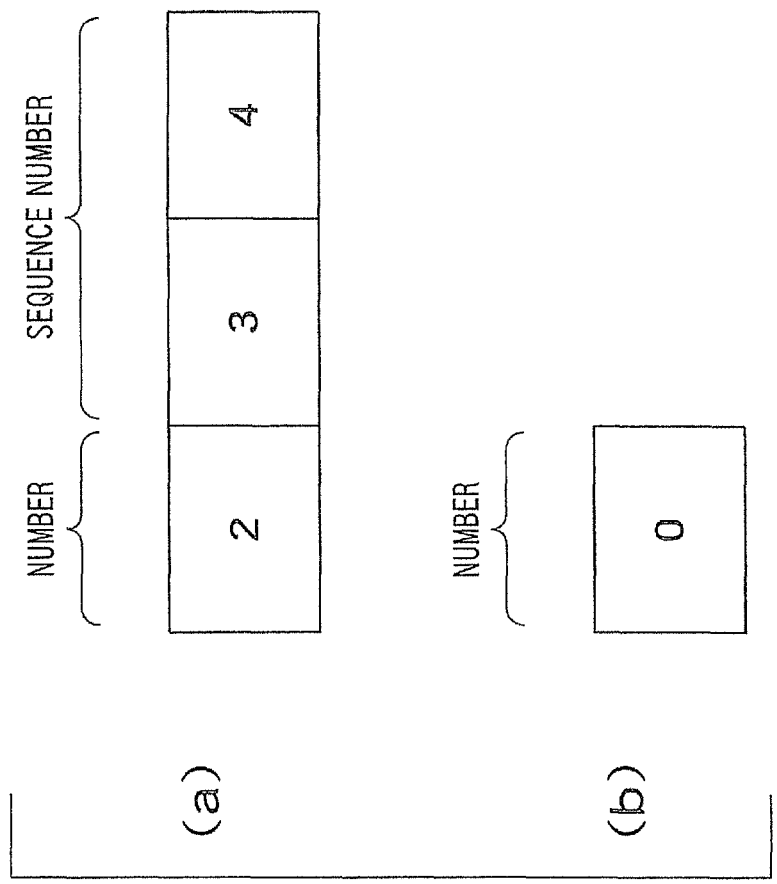
FIG. 5 is a view showing an example of precedence possibility information.

Here, the precedence possibility determining unit 102 adds, to the screen update information having the sequence number 5, the value "2" representing the number of screen updates allowing preceding screen update, and the values of "3" and "4" respectively representing sequence numbers of the screen updates allowing preceding screen update (FIG. 5A). This group of the two kinds of information is referred to as "precedence possibility information". When the screen update allowing preceding screen update does not exist, the precedence possibility determining unit 102 adds, as the precedence possibility information, only "0" to the screen update information having the sequence number 5 (FIG. 5B).

When finishing the addition of the precedence possibility information, the precedence possibility determining unit 102 outputs the screen update information to the screen update history storage 106, so as to require the screen update history storage 106 to store the history. For example, as shown in FIG. 4, the screen update history storage 106 stores the group of the sequence number, the area information, and the APP type information. Finally, the precedence possibility determining unit 102 outputs, to the distributing unit 103, the screen update information to which the precedence possibility information is added.

There is shown an example of the processing to determine whether or not screen update based on certain screen update information can be performed prior to the screen update based on the screen update information stored in the screen update history storage 106. Now, it is assumed that, when the histories stored in the screen update history storage 106 are in the state shown in FIG. 4, the precedence possibility determining unit 102 receives the screen update information which has the sequence number 5 and the area information represented as (Left, Top)–(Right, Bottom)=(400, 300)–(560, 420). Further, it is assumed that, as a result of the inquiry to the APP type acquiring unit 105, the APP type of the received screen update information is table calculation.

In the first example of the determining processing, it is determined that screen update Y can be performed prior to screen update X at the time when all the following conditions are satisfied: the APP type of the screen update Y is different from the APP type of the screen update X; and, the area information of the screen update Y does not overlap with the area information of the screen update X.

First, the precedence possibility determining unit 102 determines whether or not the screen update corresponding to the sequence number 5 can be performed prior to the screen update corresponding to the sequence number 4. The APP type (table calculation) of the screen update corresponding to the sequence number 5 is different from the APP type (document edition) of the screen update corresponding to the sequence number 4. Further, the area information (400, 300)–(560, 420) of the screen update corresponding to the sequence number 5 does not overlap with the area information (160, 120)–(320, 240) of the screen update corresponding to the sequence number 4. Therefore, the precedence possibility determining unit 102 determines that the screen update corresponding to the sequence number 5 can be performed prior to the screen update corresponding to the sequence number 4.

Next, the precedence possibility determining unit 102 determines whether or not the screen update corresponding to the sequence number 5 can be performed prior to the screen update corresponding to the sequence number 3. The APP type (table calculation) of the screen update corresponding to the sequence number 5 is different from the APP type (document edition) of the screen update corresponding to the sequence number 3. Further, the area information (400, 300)–(560, 420) of the screen update corresponding to the sequence number 5 does not overlap with the area information (80, 60)–(240, 180) of the screen update corresponding to the sequence number 3. Therefore, the precedence possibility determining unit 102 determines that the screen update corresponding to the sequence number 5 can be performed prior to the screen update corresponding to the sequence number 3.

Next, the precedence possibility determining unit 102 determines whether or not the screen update corresponding to the sequence number 5 can be performed prior to the screen update corresponding to the sequence number 2. The APP type (table calculation) of the screen update corresponding to the sequence number 5 is the same as the APP type (table calculation) of the screen update corresponding to the sequence number 2. Further, the area information (400, 300)–(560, 420) of the screen update corresponding to the sequence number 5 overlaps with the area information (320, 240)–(640, 480) of the screen update corresponding to the sequence number 2. Therefore, the precedence possibility determining unit 102 determines that the above-described conditions are not satisfied and hence the screen update corresponding to the sequence number 5 cannot be performed prior to the screen update corresponding to the sequence number 2.

In this way, when the APP types of two screen updates are different from each other, and when there is no overlapping of the area information of the two screen updates, it is hardly considered that the two screen updates are meaningfully related to each other. In such case, even when a temporally new screen update is performed prior to an old screen update (without waiting for the execution of the old screen update), it can be said that a sense of incongruity is hardly caused at user's eyes, and that the influence on working efficiency is insignificant. The precedence possibility determining unit 102 adds, to the screen update information having the sequence number 5, the information (precedence possibility information) representing that "the screen update corresponding to the sequence number 5 may be performed prior to the screen updates corresponding to the sequence numbers 3 and 4" as described in the above example. Then, the precedence possibility determining unit 102 transfers the screen update information having the sequence number 5 to the distributing unit 103 which is the processing unit following the precedence possibility determining unit 102.

Note that, in the present embodiment, the precedence possibility determining unit 102 determines that, when the APP type of the screen update Y is different from the APP type of the screen update X and when the area information of the screen update Y does not overlap with the area information of the screen update X, the screen update Y can be performed prior to the screen update X, but the present embodiment does not necessarily need to be limited to this. Any arbitrary method may be used which can determine whether or not a sense of incongruity caused at user's eyes is insignificant at the time when a temporally new screen update is performed prior to an old screen update.

For example, when the area of the screen update Y completely includes the area of the screen update X, it may be determined that the screen update Y can be performed prior to the screen update X. In this way, when a new screen update completely includes the other previous screen update, the new screen update is considered to be information highly valuable for the user, and hence it is determined that the new screen update can be performed prior to the other previous screen update. However, in this case, when the screen update based on the new screen update information Y is performed prior to the screen update based on the old screen update information X and thereafter the screen update based on the old screen update information X is performed, errors are caused in the display contents. To cope with this, a procedure is adopted in which the sequence number and the area information of a screen update previously performed is stored as a history in the collecting unit 202, and in which, immediately before certain screen update information is transferred to the display unit 203, the area information of the certain screen update information is compared with the area information of the history, so that it is checked whether or not the area information of the certain screen update information is completely included the area information of the screen update previously performed. When the area information of the certain screen update information is completely included the area information of the screen update previously performed, the processing to transfer the certain screen update information to the display unit 203 is skipped. By adding such procedure, it is possible to avoid that the errors are caused in the display contents.

Further, for example, whether or not the new screen update can be performed prior to the other previous screen update may also be determined on the basis of the hierarchy (Z order) information representing a front-rear relationship between windows to which respective screen updates belong in the window system (for example, when a plurality of windows are opened by the same application). For example, when a window to which a screen update Y belongs is displayed in front of a window to which a screen update X belongs, the screen update Y can be performed prior to the screen update X. In general, the possibility that the user is watching the window displayed on the front side is considered to be high. Therefore, even when the screen update belonging to the window displayed on the front side is performed prior to the screen update belonging to the window displayed on the rear side, a sense of incongruity caused at user's eyes is insignificant. In this case, the information representing the front-rear relationship between the windows is stored in the history.

[Processing Flow (Distribution)]

Figure 7:
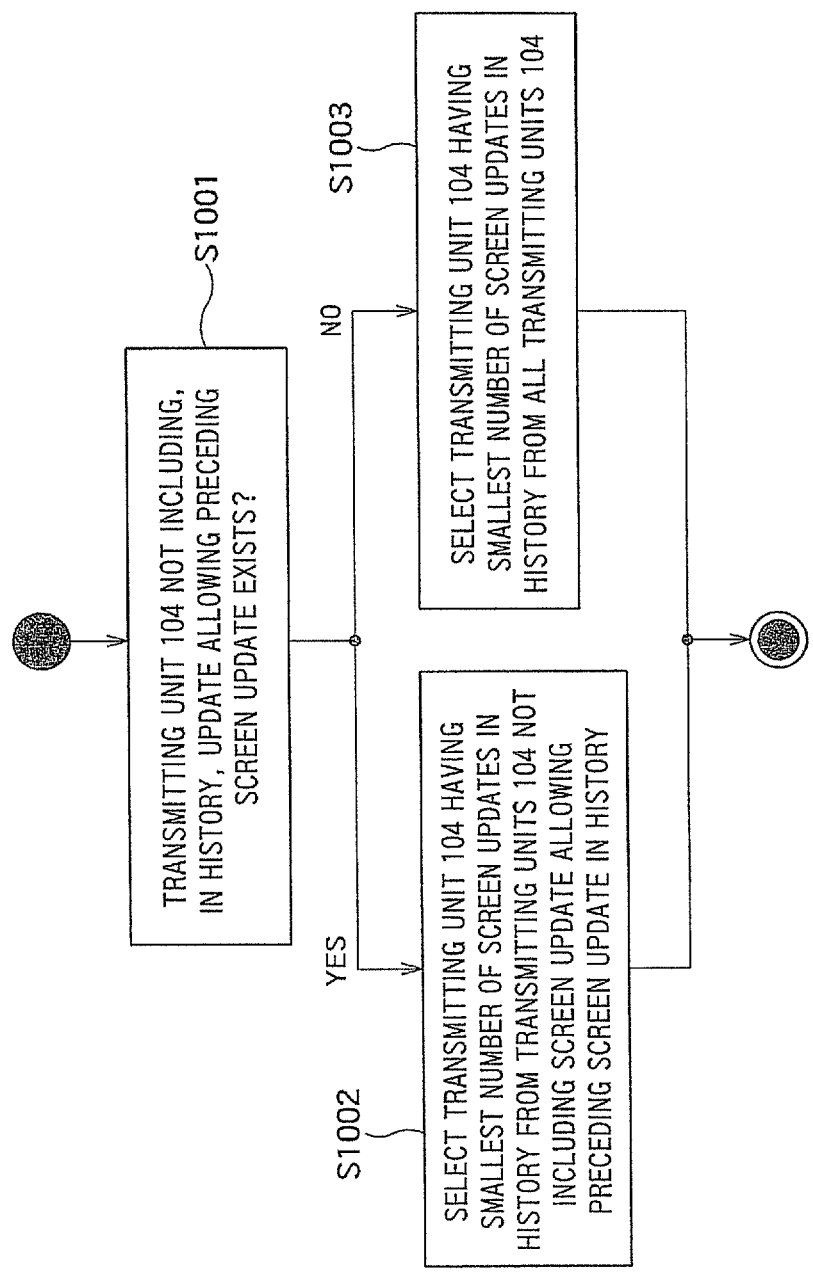
FIG. 7 is a view explaining a method for determining a distribution destination.

Next, processing of the distributing unit 103 at the time of receiving the screen update information is described. When receiving, from the precedence possibility determining unit 102, the screen update information to which the precedence possibility information is added, the distributing unit 103 distributes the screen update information to one of the plurality of transmitting units 104A, 104B and 104C. When distributing the screen update information, the distributing unit 103 determines which of the plurality of transmitting units 104 is to be used for transmitting the screen update information, by using the added precedence possibility information, and the history information of previous distribution stored in the distribution history storage 107. The distributing unit 103 selects the transmitting unit 104 in which the screen update information received from the precedence possibility determining unit 102 does not overlap with the screen update information X of screen update allowing preceding screen update. Then, the distributing unit 103 transmits the received screen update information by using the selected transmitting unit 104. Specifically, one of the transmitting units 104 is determined as the distribution destination according to the following procedures (FIG. 7).

First, the distributing unit 103 checks the existence of the transmitting unit 104 in which the screen update allowing preceding screen update is not included in the distribution history (step S1001). When such transmitting units 104 exist, the distributing unit 103 selects, among the transmitting units 104, the transmitting unit 104 in which the number of screen updates included in the distribution history is the smallest (step S1002). When such transmitting unit 104 does not exist, the distributing unit 103 selects, among all the transmitting units 104, the transmitting unit 104 in which the number of screen updates included in the distribution history is the smallest (step S1003).

Figure 6:
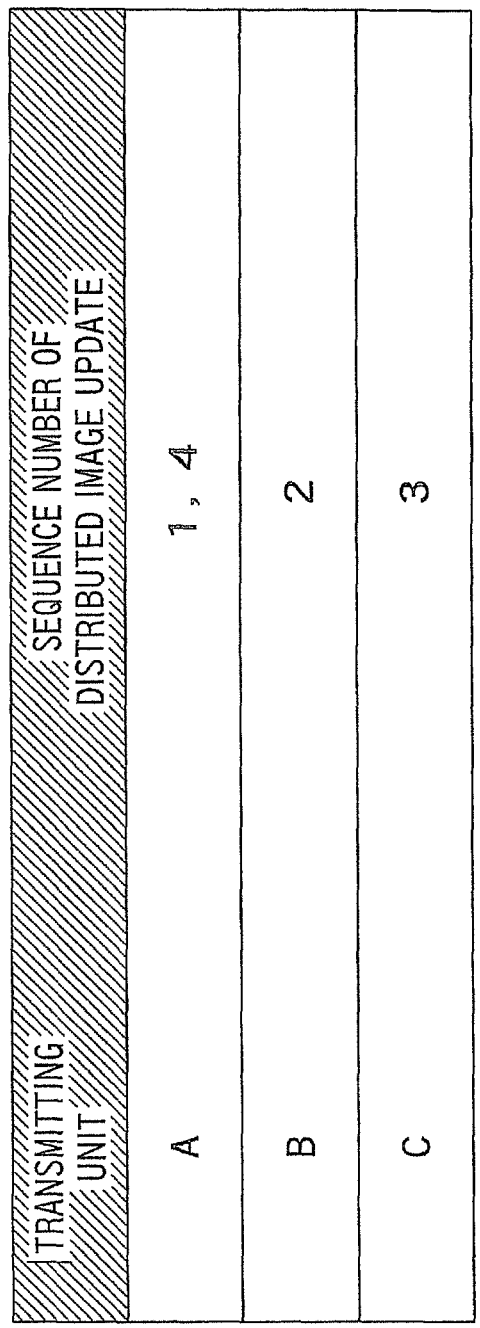
FIG. 6 is a view showing information stored in a distribution history storage.

A first operation example is described. Now, it is assumed that the information as shown in FIG. 6 is stored in the distribution history storage 107. In FIG. 6, it is shown that, among the three transmitting units 104A, 104B and 104C, the transmitting unit 104A transmitted screen update information having sequence numbers 1 and 4, the transmitting unit 104B transmitted the screen update information having the sequence number 2, and the transmitting unit 104C transmitted the screen update information having the sequence number 3. It is assumed that, in this state, the distributing unit 103 receives the screen update information having the sequence number 5 from the precedence possibility determining unit 102. It is assumed that the screen update based on the screen update information having the sequence number 5 can be performed prior to the screen updates based on the screen update information having the sequence numbers 3 and 4. At this time, by referring to the information which is shown in FIG. 6 and which is acquired from the distribution history storage 107, the distributing unit 103 checks the existence of the transmitting unit 104 in which the screen updates allowing preceding screen update and corresponding to the sequence numbers 3 and 4 are not included in the distribution history. Only the transmitting unit 104B corresponds to this condition. Therefore, the distributing unit 103 selects the transmitting unit 104B as the distribution destination of the screen update information having the sequence number 5, and adds the sequence number and the precedence possibility information to the screen update information (area information and image information). Then, the distributing unit 103 transmits the resultant screen update information: to the transmitting unit 104B and ends the distribution processing.

Further, it is assumed that the distributing unit 103 then receives the screen update information having the sequence number 6 from the precedence possibility determining unit 102. It is assumed that the screen update corresponding to the sequence number 6 can also be performed prior to the screen updates corresponding to the sequence numbers 3 and 4. At this time, the distributing unit 103 performs determination similar to the above-described determination, and selects the transmitting unit 104B as the distribution destination of the screen update information having the sequence number 6.

A second operation example is described. Now, it is assumed that, similarly to the first operation example, the information as shown in FIG. 6 is stored in the distribution history storage 107. It is assumed that, in this state, the distributing unit 103 receives the screen update information having the sequence number 5 from the precedence possibility determining unit 102. It is assumed that the screen update corresponding to the sequence number 5 can be performed prior to only the screen update corresponding to the sequence number 3. At this time, the distributing unit 103 checks, in step S1001, the existence of the transmitting unit 104 in which the screen update corresponding to the sequence numbers 3 is not included in the distribution history. The transmitting units 104A and 104B correspond to this condition. Further, the transmitting unit 104A includes two histories, and the transmitting unit 104B includes one history. Therefore, the distributing unit 103 selects the transmitting unit 104B as the distribution destination of the screen update information having the sequence number 5.

A third operation example is described. Now, it is assumed that, similarly to the first operation example, the information as shown in FIG. 6 is stored in the distribution history storage 107. It is assumed that, in this state, the distributing unit 103 receives the screen update information having the sequence number 5 from the precedence possibility determining unit 102. It is assumed that the screen update corresponding to the sequence number 5 can be performed prior to the screen updates corresponding to the sequence numbers 2, 3 and 4. At this time, the distributing unit 103 checks, in step S1001, the existence of the transmitting unit 104 in which the screen updates corresponding to the sequence numbers 2, 3 and 4 are not included in the distribution history. Such transmitting unit 104 does not exist. Further, the transmitting unit 104A includes two histories, and each of the transmitting units 104B and 104C includes one history. Therefore, the distributing unit 103 randomly selects the transmitting unit 104B or the transmitting unit 104C as the distribution destination of the screen update information having the sequence number 5.

In this way, the distributing, unit 103 selects the transmitting unit 104 in which the screen update allowing preceding screen update is not included in the distribution history. Thereby, even when a packet is lost in the other transmitting unit 104, the selected transmitting unit 104 can complete the transmission of the screen update information to the client terminal 2 without waiting for the completion of retransmission of the lost packet.

Note that, in the present embodiment, the distribution destination is selected by using the number of the distributed screen update information, but the selection of the distribution destination does not necessarily need to be performed on the basis of the number of distributed screen update information. The distribution destination may be determined by an arbitrary method as long as the selection is performed on the basis of the principle of avoiding the transmitting unit 104 in which the screen update information to be distributed overlaps with the screen update information allowing preceding screen update.

For example, the total sum of the data sizes of screen updates may be used instead of the number of the distributed screen update information. In this case, in steps S1002 and S1003 in FIG. 7, it is possible to perform processing configured such that the distribution history storage 107 stores, as a history, the image data size of the screen update distributed to each of the transmitting units 104, and such that the distributing unit 103 calculates the total sum of the data sizes of the screen updates stored as the history for each of the transmitting units 104, and selects, as the distribution destination, the transmitting unit 104 having the smallest total sum of the data size.

For example, not only the number and data size of the screen updates, but also an arbitrary status value of each of the transmitting units 104 may be used. In steps S1002 and S1003 in FIG. 7, it is possible to perform processing configured, for example, such that the value of congestion window of TCP of each of the transmitting units 104 is acquired, and such that the transmitting unit 104 having the largest value is selected as the distribution destination. Further, it is possible to perform processing configured, for example, such that the value of the free space of TCP transmission buffer of each of the transmitting units 104 is acquired, and such that the transmitting unit 104 having the largest value is selected as the distribution destination.

In this way, by using the number and data size of the distributed screen update information, or the value of congestion window of TCP, the transmitting unit 104, in which the transmission to the client terminal 2 can be quickly completed with higher possibility, can be preferentially assigned to the screen update information executable in advance.

Note that, in the present embodiment, the distribution of the screen update information is performed so that the screen update information one-to-one corresponds to the transmitting unit 104, but the correspondence between the screen update information and the transmitting unit 104 does not necessarily need to be limited to the one-to-one correspondence. The present embodiment may be configured such that one piece of screen update information is division-processed, so as to be assigned to two or more transmitting units 104.

Figure 8:
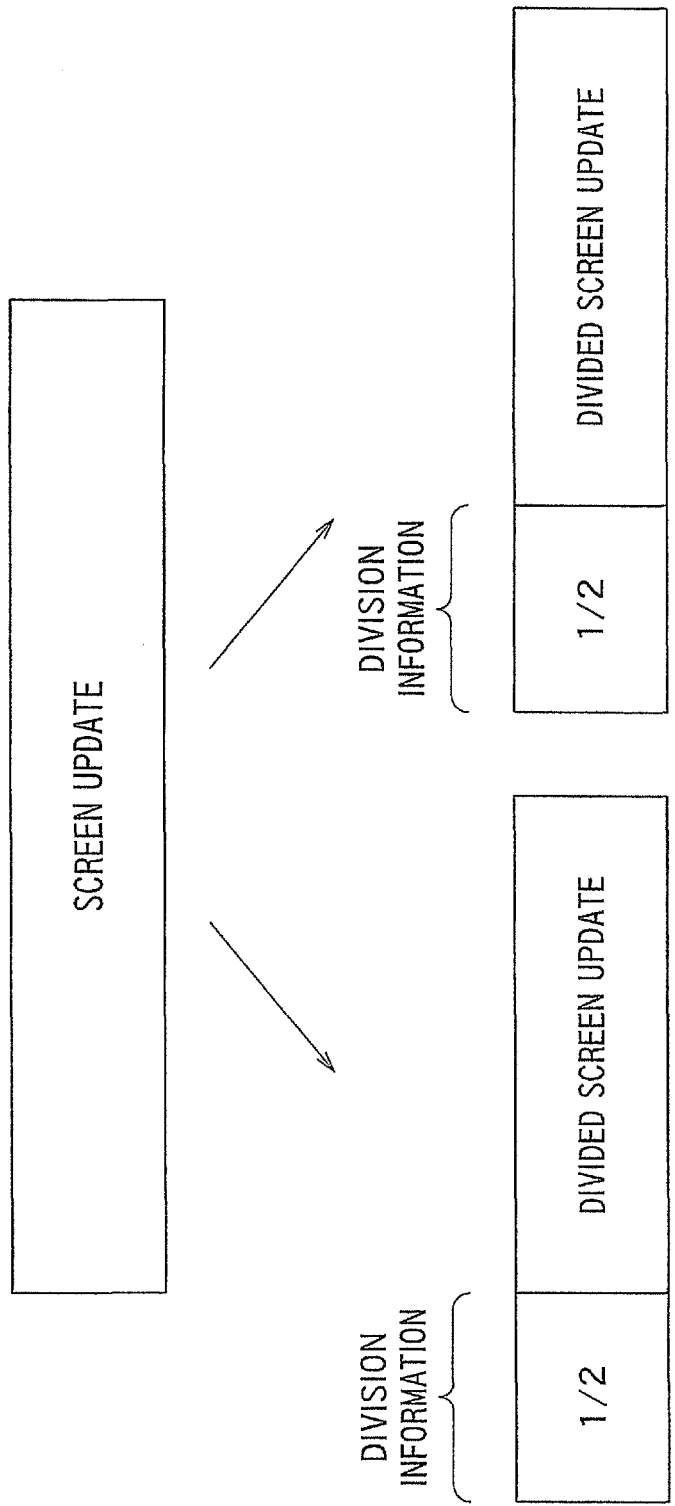
FIG. 8 is a view showing an example in which the screen update information is divided.

For example, the present embodiment may be configured such that the screen update information is divided into two pieces of information, and the two pieces of information are respectively distributed to different transmitting units 104. A division example is shown in FIG. 8. In FIG. 8, as information relating to the division (division information), "½" representing the first of the divided two pieces of information is attached to the first divided screen update information, and "2/2" representing the second of the divided two pieces of information is attached to the second divided screen update information. Further, the distributing unit 103 performs the same distribution procedure as that shown in FIG. 7 to each of the first and second divided screen update information. When the screen update information is divided in this way, the size of data transmitted to the plurality of transmitting units 104 is made uniform. Thereby, it is possible to reduce the time required for completion of transmission of the screen update information.

Further, the present embodiment may be configured, for example, such that copies of the screen update information are made, and such that the copies are respectively transmitted to the different transmitting units 104. Also, in this case, the same distribution procedure as shown in FIG. 7 is performed to each of the copies of the screen update information by the distributing unit 103. Thereby, even in the case where packet missing occurs in one of the copies of the screen update information, when the other copy of the screen update information is transmitted with no packet missing, a display delay can be avoided.

Note that, in the present embodiment, the distribution procedure is performed by the distributing unit 103 so that all the transmitting units 104 are used, but the present embodiment does not necessarily need to be limited to this. For example, a part of the transmitting units 104 may be exclusively used for the screen update information Y of screen update executable in advance. That is, the distribution destination of screen update information without screen update executable in advance is selected so that the transmitting unit 104, which is different from the transmitting unit 104 to be exclusively used for the screen update information of screen update executable in advance, is used. In this way, the screen update information Y of screen update executable in advance can be promptly displayed by using the transmitting unit 104 exclusively used for the screen update information Y.

Note that, in the present embodiment, the image information included in the screen update information is not subjected to conversion processing, such as image compression processing, but the present embodiment does not necessarily need to be limited to this. The image information included in the screen update information may be subjected to arbitrary image compression processing, such as JPEG and ZLIB. Further, the image compression method, the image compression ratio, and the like, may be changed according to whether or not the screen update can be performed in advance. For example, in the case where a screen update based on screen update information can be performed in advance, the compression ratio of image information included in the screen update information is set higher than usual and thereby the data size of the screen update information can be reduced. As a result, the time required for transmission of the screen update information can be reduced and the image information can be promptly displayed.

As described above, the distributing unit 103 selects, as the distribution destination of the screen update information Y, the transmitting unit 104 in which the screen update information X allowing preceding screen update does not overlap with the screen update information Y. By using the selected transmitting unit, the distributing unit 103 transmits the screen update information Y. When receiving the screen update information Y, the transmitting unit 104 transfers the received data to the corresponding receiving unit 201 through processing of acknowledgment response (ACK), processing of retransmission control, and the like.

[Processing Flow (from Reception to Display)]

Each of the receiving units 201A, 201B and 201C of the client terminal 2 receives the screen update information from each of the transmitting units 104 respectively corresponding to the receiving units 201A, 201B and 201C. Connection-type communication is performed between a pair of the transmitting unit 104 and the receiving unit 201, so that the screen update information passed to the transmitting unit 104 is transmitted to the receiving unit 201 in order without loss. Each of the receiving units 201 transfers the received screen update information to the collecting unit 202.

Figure 9:
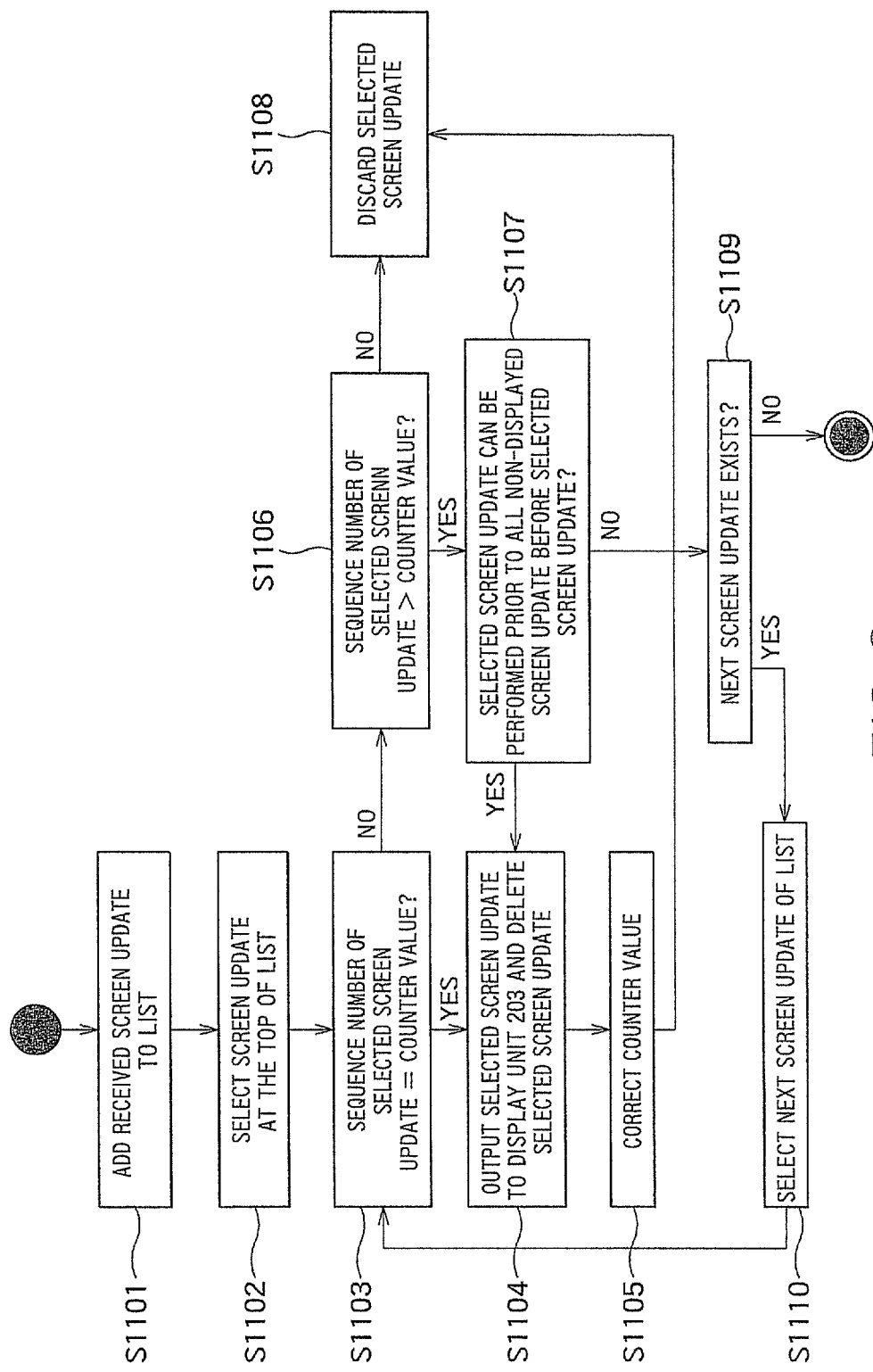
FIG. 9 is a flow chart of an operation of a client terminal.

The collecting unit 202 collects the screen update information received from the receiving units 201. The processing of the collecting unit 202 is described with reference to FIG. 9. The collecting unit 202 has a storage area for storing the list of the screen update information which is not subjected to display processing. In this list, the screen update information is stored in the state of being sorted in the order of sequence number. Further, the collecting unit 202 has a counter which stores the value (zero start) of the present sequence number.

First, the collecting unit 202 adds the received screen update information to the list (step S1101). FIG. 10 shows an example of the information stored in the list. In FIG. 10, the description of the area information and the image information is omitted for the purpose of illustration.

Next, the collecting unit 202 selects the screen update information in order from the top of the list, and checks whether or not the screen update information which can be displayed on the display unit 203 exists (step S1102). The collecting unit 202 checks whether or not the sequence number of the selected screen update information is equal to the value of the counter (step S1103). When the sequence number of the selected screen update information is equal to the value of the counter, the collecting unit 202 determines that the screen update information can be displayed, and deletes the screen update information from the list after outputting the screen update information to the display unit 203 (step S1104). Further, the collecting unit 202 corrects the value of the counter so that the value of the counter indicates the sequence number of the oldest screen update information which is not displayed yet (step S1105).

In the case where the selected screen update information has an order value newer (a sequence number larger) than the value of the counter (step S1106), when the screen update based on the selected screen update information can be executed prior to all the non-displayed screen update information older than the screen update information (step S1107), the collecting unit 202 determines that the selected screen update information can be displayed, and deletes the selected screen update information from the list after outputting the selected screen update information to the display unit 203.

In the case where the selected screen update information has an order value older (a sequence number smaller) than the value of the counter (step S1108), the collecting unit 202 discards the selected screen update information.

When the above-described processing is finished for the screen update information at the top of the list, the collecting unit 202 selects next screen update information (step S1110), and repeats the same processing.

A specific example is described. Now, it is assumed that, in the state of the list shown in FIG. 10, the collecting unit 202 receives screen update information that has the sequence number 5 and also includes the precedence possibility information in which the number of screen updates allowing preceding screen update is set to 3, and in which the sequence numbers of the screen updates allowing preceding screen update are set to 2, 3 and 4. Also, it is assumed that the value of the counter at this time is set to 2. FIG. 11 shows the state of the list immediately after the received screen update information is added to the list by the collecting unit 202.

Here, from the screen update information at the top of the list, the collecting unit 202 sequentially checks whether or not the screen update information can be displayed on the display unit 203. Since the counter value is 2, the list is in the state where the screen update information having the sequence number 2 is not received. In the screen update information having the sequence number 3 and 4, the number of screen update information allowing preceding screen update is 0. That is, the display processing of the screen update information having any of the sequence numbers 3 and 4 cannot be performed in advance. Therefore, the screen update information having the sequence numbers 3 and 4 cannot be displayed at this time.

Next, the collecting unit 202 checks the screen update information having the sequence number 5. The screen update corresponding to the sequence number 5 can be performed prior to the screen updates respectively corresponding to the sequence numbers of 2, 3 and 4. Since the screen update information having the sequence number 5 can be displayed prior to all the non-displayed screen update information having the sequence numbers less than 5, the collecting unit 202 determines that the screen update information having the sequence number 5 can be displayed. Therefore, the collecting unit 202 outputs, to the display unit 203, the screen update information having the sequence number 5, and then deletes the screen update information having the sequence number 5 from the list. The state of the list becomes as shown in FIG. 12. Note that, apart from the information of the list, the collecting unit 202 stores the value of the sequence number of the screen update information displayed in advance. Here, the collecting unit 202 stores the value of 5.

Next, the collecting unit 202 checks the screen update information having the sequence number of 6. The screen update corresponding to the sequence number 6 can be performed prior to the screen updates corresponding to the sequence numbers of 2, 3 and 4. Since the screen update information having the sequence number 6 can be displayed prior to all the non-displayed screen update information having the sequence numbers less than 6, the collecting unit 202 determines that the screen update information having the sequence number 6 can be displayed. Therefore, the collecting unit 202 outputs, to the display unit 203, the screen update information having the sequence number 6, and then deletes the screen update information having the sequence number 6 from the list. The state of the list becomes as shown in FIG.

13. The collecting unit 202 stores the values of 5 and 6 as the sequence numbers of the screen update information displayed in advance. Since the next screen update information does not exist in the list, the collecting unit 202 ends the processing shown in FIG. 9.

Further, it is assumed that the collecting unit 202 then receives, from the receiving unit 201, the screen update information having the sequence number 2, and the processing of the collecting unit 202 at this time is described. It is assumed that the screen update based on the screen update information having the sequence number 2 does not precede any of the screen update based on the other screen update information. FIG. 14 shows the state of the list immediately after the screen update information having the sequence number 2 is added to the list. Here, from the top of the list, the collecting unit 202 sequentially checks whether or not the screen update information can be displayed. Since the sequence number of the screen update information at the top of the list and the value of the counter are both equal to 2, the collecting unit 202 outputs the screen update information to the display unit 203, and then deletes the screen update information from the list. Further, the collecting unit 202 changes the value of the counter to 3 which is the sequence number of the oldest screen update information which is not displayed. The collecting unit 202 performs similar determination processing to the screen update information having the sequence number 3, which is the next screen update information in the list. The collecting unit 202 outputs the screen update information having the sequence number 3 to the display unit 203, and then deletes the screen update information from the list. The collecting unit 202 changes the value of the counter from 3 to 4. The collecting unit 202 also performs similar determination processing to the screen update information having the sequence number 4. The collecting unit 202 outputs the screen update information having the sequence number 4 to the display unit 203, and then deletes the screen update information from the list. The collecting unit 202 changes the value of the counter from 4 to 7.

[Effects and Summary]

As described above, according to the present embodiment, even when a packet is lost in a TCP connection (in communication between a pair of the transmitting unit 104 and the receiving unit 201), an image of the screen update information transmitted and received through the other TCP connection can be displayed in advance without waiting for the completion of retransmission of the packet. Thereby, a display delay can be avoided, so as to prevent deterioration of responsiveness. Further, an image of the screen update information is selectively displayed in advance, in which the image is determined to give less sense of incongruity to the user even at the time when the image is displayed in advance. Thereby, both deterioration of responsiveness and lowering of use feeling of the user can be avoided.

Note that, in the present embodiment, the information stored in the screen update history storage 106 and the distribution history storage 107 is assumed to be permanently held, but the present embodiment does not necessarily need to be limited to this. For example, the information, which is held for a period longer than a predetermined period from the start of storage of the information, may be deleted. By suitably deleting unnecessary information in this way, the storage capacity can be saved. Alternatively, it may also be configured, for example, such that, when the transmission of the screen update information is completed by the transmitting unit 104, the completion of the transmission is notified from the transmitting unit 104 to the screen update history storage 106 and the division history storage 107, so as to allow the corresponding information to be deleted. Thereby, more accurate determination and distribution can be performed on the basis of the information about the latest situation.

The server and the client terminal of this embodiment may also be realized using a general-purpose computer device as basic hardware. That is, each processing unit in the server and the client terminal can be realized by causing a processor mounted in the above described computer device to execute a program. In this case, the server and the client terminal may be realized by installing the above described program in the computer device beforehand or may be realized by storing the program in a storage medium such as a CD-ROM or distributing the above described program over a network and installing this program in the computer device as appropriate. Furthermore, each storage in the server and the client terminal may also be realized using a memory device or hard disk incorporated in or externally added to the above described computer device or a storage medium such as CD-R, CD-RW, DVD-RAM, DVD-R as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A server comprising:
    a screen update generating unit configured to generate screen update information representing an image of an update area in a screen;
    first to N-th (N is an integer of 2 or more) transmitting units configured to communicate with a client terminal;
    a distributing unit configured to distribute the screen update information to the transmitting unit selected from the first to the N-th transmitting units;
    a screen update history storage configured to store a generation history of screen update information; and
    a precedence possibility determining unit configured to specify, based on the generation history of screen update information, screen update information X and Y such that the screen update information X is more previously generated than the screen update information Y and that the image of the screen update information Y is permitted to be displayed prior to the screen update information X,
    wherein the distributing unit distributes the screen update information Y to the transmitting unit different from the transmitting unit to which the screen update information X is distributed and
    the first to the N-th transmitting units the transmit screen update information distributed by the distributing unit to the client terminal.

2. The server according to claim 1, wherein
    the screen update history storage stores generation history of update areas as the generation history of screen update information, and
    the precedence possibility determining unit specifies the screen update information X and Y based on positional relationship between update areas of the screen update information.

3. The server according to claim 2, wherein the precedence possibility determining unit specifies, as the screen update information X and Y, screen update information whose update areas do not overlap each other.

4. The server according to claim 2, wherein the precedence possibility determining unit specifies the screen update information X and Y such that the update area of the screen update information X is included in the update area of the screen update information Y.

5. The server according to claim 1, further comprising
an APP type acquiring unit configured to acquire a type of application by which the screen update information is generated,
wherein the screen update history storage stores the type of the application in association with the screen update information, and
the precedence possibility determining unit specifies the screen update information X and Y such that the screen update information X belongs to an application different from that of the screen update information Y.

6. The server according to claim 1, wherein
the screen update history storage stores hierarchy information of a window in which the screen update information is generated, and
the precedence possibility determining unit specifies the screen update information X and Y such that the screen update information X belongs to a window on a rear side from a window to which the screen update information Y belongs.

7. The server according to claim 1, further comprising
a distribution history storage configured to store distribution history of screen update information to the first to the N-th transmitting units,
wherein the distributing unit determines distribution destination of the screen update information to the transmitting unit for which a distributed number of screen update information is smallest in the distribution history.

8. The server according to claim 1, further comprising
a distribution history storage configured to store distribution history of screen update information to the first to the N-th transmitting units and image sizes of screen update information distributed to the first to the N-th transmitting units,
wherein the distributing unit determines distribution destination of the screen update information to the transmitting unit by which a total sum of image sizes of screen update information distributed is smallest in the distribution history.

9. The server according to claim 1, wherein the distributing unit determines, based on communication states of the first to the N-th transmitting units, distribution destination of the screen update information.

10. The server according to claim 9, wherein the distributing unit determines distribution destination of the screen update information to the transmitting unit having a maximum value of congestion window among the first to the N-th transmitting units.

11. The server according to claim 9, wherein the distributing unit determines distribution destination of the screen update information to the transmitting unit having a maximum free space of transmission buffer among the first to the N-th transmitting units.

12. The server according to claim 1, further comprising
a sequence number setting unit configured to set a sequence number to the screen update information,
wherein the first to the N-th transmitting units transmit, together with the screen update information, the sequence number of the screen update information and precedence possibility information including a sequence number of the screen update information X.

13. A screen transfer system comprising
the server according to claim 1, and the client terminal,
wherein the client terminal includes
first to N-th receiving units configured to receive the screen update information from the first to N-th transmitting units, and
a display unit configured to display images of the screen update information received by the first to N-th receiving units.

14. The system according to claim 13, wherein the server comprises a sequence number setting unit configured to set a sequence number to the screen update information generated by the screen update generating unit,
the first to N-th transmitting units of the server transmit, together with the screen update information, the sequence number of the screen update information and precedence possibility information including a sequence number of the screen update information X, and
the client terminal determines, based on the sequence number of the screen update information and the precedence possibility information, a display sequence of images of screen update information received by the first to N-th receiving units.

15. The system according to claim 14, wherein the client terminal displays, when unreceived screen update information having a smaller sequence number exists and when a sequence number of unreceived screen update information is all included in the precedence possibility information, the image of the screen update information prior to the image of the unreceived screen update information.

16. A server comprising:
generating screen update information representing an image of an update area in a screen;
distributing the screen update information to a transmitting unit selected from first to the N-th (N is an integer of 2 or more) transmitting units;
storing a generation history of screen update information in a screen update history storage; and
specifying, based on the generation history of screen update information, screen update information X and Y such that the screen update information X is more previously generated than the screen update information Y and that the image of the screen update information Y is permitted to be displayed prior to the screen update information X, wherein the distributing includes distributing the screen update information Y to the transmitting unit different from the transmitting unit to which the screen update information X is distributed, and
transmitting the screen update information distributed to the first to the N-th transmitting units to the client terminal therefrom.

\* \* \* \* \*